(12) United States Patent
Abraham

(10) Patent No.: US 9,546,873 B2
(45) Date of Patent: *Jan. 17, 2017

(54) DETERMINING GPS MODE OF OPERATION BASED UPON ACCELEROMETER INPUT

(71) Applicant: BROADCOM CORPORATION, Irvine, CA (US)

(72) Inventor: Charlie Abraham, Los Gatos, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,234

(22) Filed: Jul. 13, 2015

(65) Prior Publication Data

US 2015/0316654 A1  Nov. 5, 2015

Related U.S. Application Data

(63) Continuation of application No. 13/113,775, filed on May 23, 2011, now Pat. No. 9,080,875.

(60) Provisional application No. 61/484,939, filed on May 11, 2011.

(51) Int. Cl.
| | |
|---|---|
| *G01P 15/00* | (2006.01) |
| *G01C 21/10* | (2006.01) |
| *G01S 19/35* | (2010.01) |
| *G01S 19/26* | (2010.01) |
| *G01S 19/29* | (2010.01) |
| *G01S 19/42* | (2010.01) |

(52) U.S. Cl.
CPC ............... *G01C 21/10* (2013.01); *G01S 19/26* (2013.01); *G01S 19/29* (2013.01); *G01S 19/35* (2013.01); *G01S 19/421* (2013.01)

(58) Field of Classification Search
CPC .......... G01C 21/10; G01S 19/26; G01S 19/29; G01S 19/421

See application file for complete search history.

(56) References Cited

U.S. PATENT DOCUMENTS

| | | | |
|---|---|---|---|
| 6,351,236 B1* | 2/2002 | Hasler | G01S 19/36 342/357.59 |
| 6,844,846 B1* | 1/2005 | Riday | G01S 19/35 342/357.52 |
| 8,438,373 B2* | 5/2013 | Rubin | H04M 1/72563 713/1 |

* cited by examiner

*Primary Examiner* — Elias Desta
(74) *Attorney, Agent, or Firm* — Garlick & Markison; Bruce E. Garlick

(57) ABSTRACT

An electronic device is operable to determine a Global Positioning System (GPS) mode of operation based upon accelerometer input. The electronic device includes a communications interface, a GPS receiver, an accelerometer module, and processing circuitry. The processing circuitry receives an accelerometer output from the accelerometer module and compares the accelerometer output to a plurality of acceleration signatures. Based upon the comparison, an acceleration profile is selected. A GPS mode of operation is selected for the GPS receiver based upon the acceleration profile. The acceleration profile can be selected based upon one or more types of communications being serviced by the communications interface. In one embodiment, a selected GPS mode of operation selected corresponds to a distinct operating environment.

20 Claims, 6 Drawing Sheets

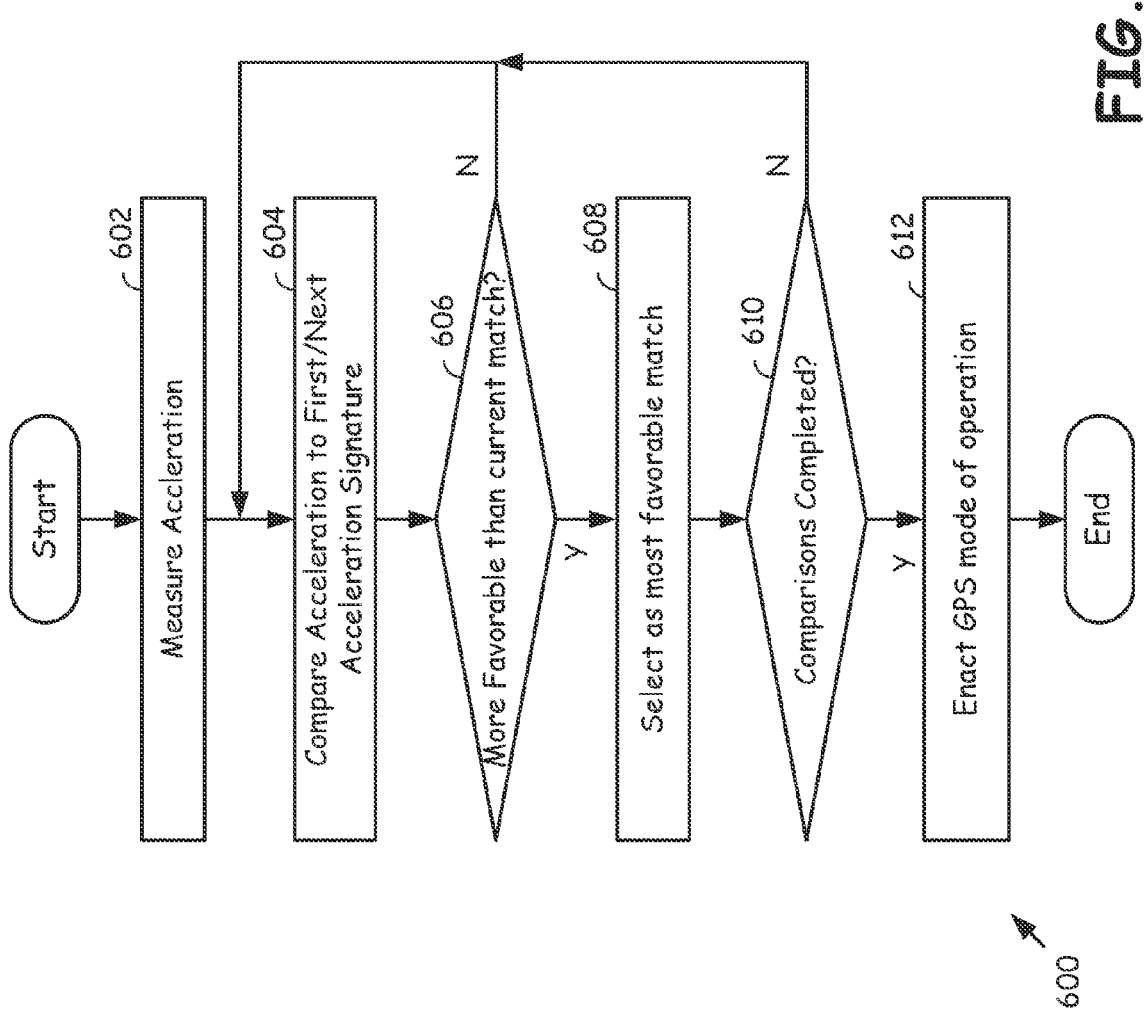

DETERMINING GPS MODE OF OPERATION BASED UPON ACCELEROMETER INPUT

CROSS-REFERENCE TO PRIORITY APPLICATION

The present U.S. Utility Patent Application claims priority pursuant to 35 U.S.C. §120 as a continuation of U.S. Utility application Ser. No. 13/113,775, entitled "Determining GPS Mode of Operation Based Upon Accelerometer Input," filed May 23, 2011, pending, scheduled to issue as U.S. Pat. No. 9,080,875, which claims priority pursuant to 35 U.S.C. §119(e) to U.S. Provisional Application No. 61/484,939, entitled "Determining GPS Mode of Operation Based Upon Accelerometer Input," filed May 11, 2011, both of which are hereby incorporated herein by reference in their entirety and made part of the present U.S. Utility Patent Application for all purposes.

BACKGROUND OF THE INVENTION

1. Field of the Invention

The present invention relates generally to electronic devices; and more particularly to electronic devices supporting Global Positioning System (GPS) operations.

2. Description of the Related Art

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

Mobile navigation systems have become quite popular. Hand-held Global Positioning System (GPS) terminals have been available for some time and are commonly used. These hand-held GPS terminals include those that may be mounted in an automobile, an aircraft, or a boat, and those simply carried by a person. Many cellular telephones now have GPS receivers and supporting applications to support GPS navigation.

Determining a GPS location is typically processing intensive. Various GPS operational parameters must be selected based upon the use of the GPS device. For example, a GPS device servicing an airplane must compensate for the Doppler Effect caused by its motion. Further, navigation systems using GPS coordinates must also be customized based upon an application. A user of a cellular telephone having a GPS receiver typically walks for a number of steps, stops to view the surrounding, and continues walking. The GPS navigation application must operate so as to accurately depict the user's location in such operations. Likewise, an automobile navigation system must consider that an automobile does typically venture off-road at speed or creep into intersections. These problems must be addressed for the cellular phone application even though the particular operational mode of the cellular phone is not known.

BRIEF DESCRIPTION OF THE DRAWINGS

FIG. 6 is a flowchart illustrating detailed operations of an electronic device having a GPS receiver and an accelerometer module according to one or more embodiments of the present invention.

DETAILED DESCRIPTION

Figure 1:
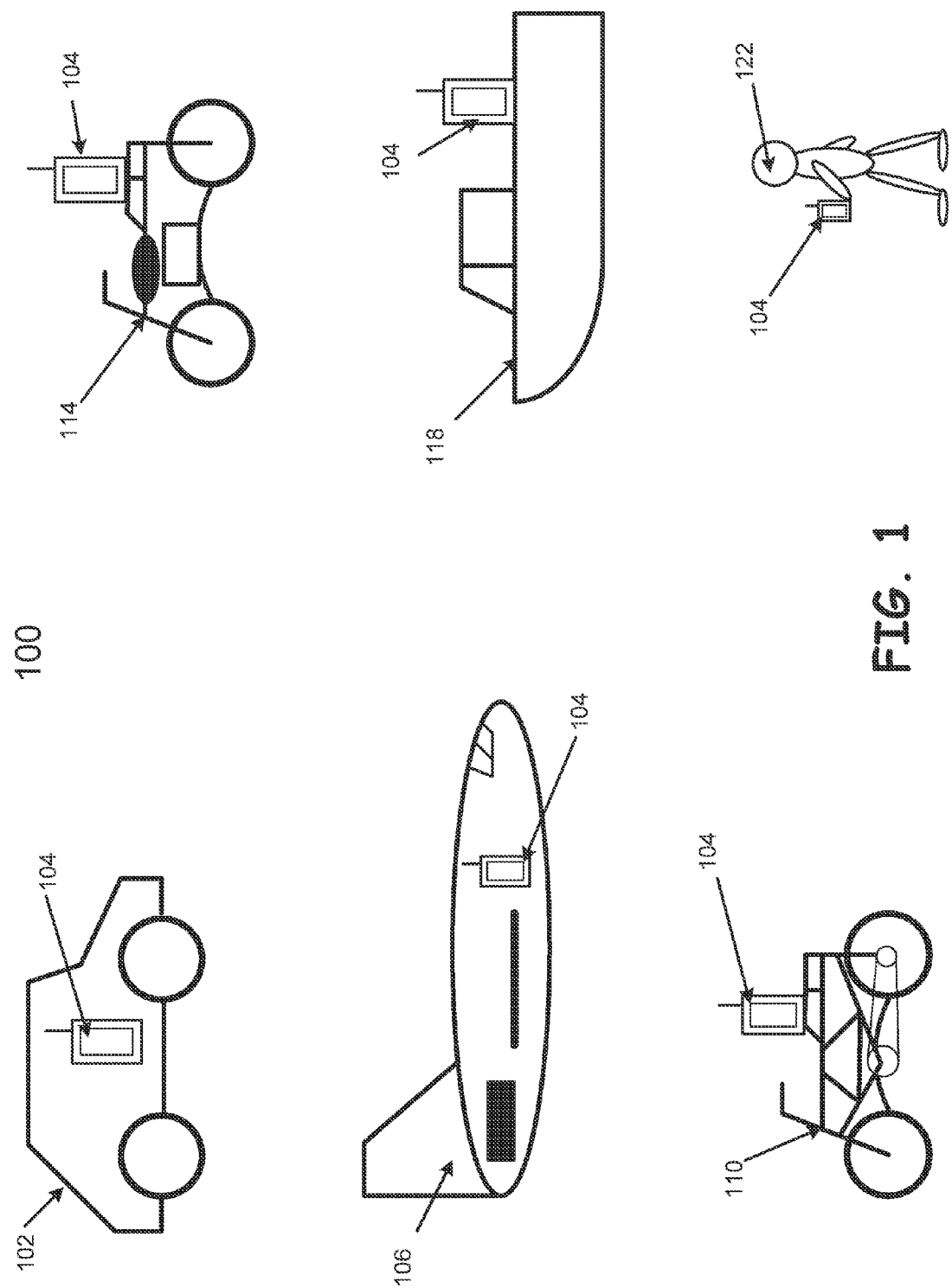
FIG. 1 is a system diagram illustrating a system constructed according to one or more embodiments of the present invention.

FIG. 1 is a system diagram illustrating a system constructed according to one or more embodiments of the present invention. FIG. 1 shows various transportation modes (e.g. car 102, airplane 106, bicycle 110, motorcycle 114, boat 118, and pedestrian 124) each having an electronic device 104. It is understood that the present invention could apply to other modes of transportation not shown in FIG. 1, such as train, and various types of transportation modes, such as a fishing boat, sailboat, cruise ship as "boats", and the like.

The electronic device 104 includes a Global Positioning System (GPS) receiver, an accelerometer module containing one or more accelerometers that sense and measure acceleration in up to 3 axes and that is operable to produce accelerometer output. The electronic device further includes processing circuitry coupled to the communications interface and to the accelerometer module. The processing circuitry is operable to compare the accelerometer module output to a plurality of acceleration signatures. Based upon this comparison, an acceleration profile is selected. A GPS mode of operation for the GPS receiver based upon the acceleration profile. Each electronic device 104 may also include a communications interface that supports communications with a network and/or other devices.

In one embodiment, the acceleration profile may be further selected based upon one or more types of communications being serviced by the communications interface of the electronic device 104. For example, cellular service is not available in airplanes or remote boating areas. In another embodiment, a selected GPS mode of operation may be selected that corresponds to a distinct operating environment. In another embodiment, the communications interface of the electronic device 104 supports at least one of cellular communications, Wireless Local Area Network (WLAN) communications, Wireless Personal Area Network (WPAN) communications, Satellite communication system communications, Wireless Wide Area Network (WWAN) communications, millimeter wave communications, and near field communications.

In one embodiment, the processing circuitry is further operable to select the GPS mode of operation based upon GPS location data. For example, the electronic device 104 may detect being over water, which would indicate the electronic device 104 could be in a boat or airplane, but not typically in a car or with a pedestrian. In another embodiment, the processing circuitry is further operable to select a differing acceleration profile based upon additional accelerometer output.

According to one aspect of the present invention as will be further described with reference to the FIGs, at least one acceleration signature comprises a periodic acceleration component and an acceleration magnitude component. For example, an acceleration magnitude differs with various acceleration magnitudes or vibration periods, such as a walking vibration period, car vibration period, boat vibration period, train vibration period, airplane vibration period, and the like. The acceleration magnitudes are discussed in more detail herein with FIG. 5.

In one embodiment, the accelerometer output comprises data in two dimensions, and at least one acceleration signature comprises two dimensional components. In another embodiment, the accelerometer output comprises data in three dimensions, and at least one acceleration signature comprises three dimensional components.

GPS navigation algorithms often use a Kalman filter to estimate position and velocity. The Kalman Filter includes a dynamic model of the user motion, which may be modified depending on the GPS mode of operation. Additionally, the GPS navigation algorithms typically utilize various heuristic algorithms to detect stationary and non-stationary conditions. For example, small changes in position, especially at low velocity may be ignored under the assumption these result from measurement noise and/or multipath fading. The position may be said to be "clamped". The parameters of the heuristic algorithm, such as the amount of position change or velocity change before the position is "released" may be chosen based on the GPS mode of operation.

In a GPS measurement engine, tracking loops are typically utilized to follow signals. These loops have bandwidths that may be selected based on the GPS mode of operation. The acquisition algorithms typically have parameters such as integration time and coherent averaging interval that may be selected based on the GPS mode of operation. More generally, any parameter affecting the receiver's behavior that depends on the type of motion being experienced may be adjusted based on the GPS mode of operation.

Figure 2:
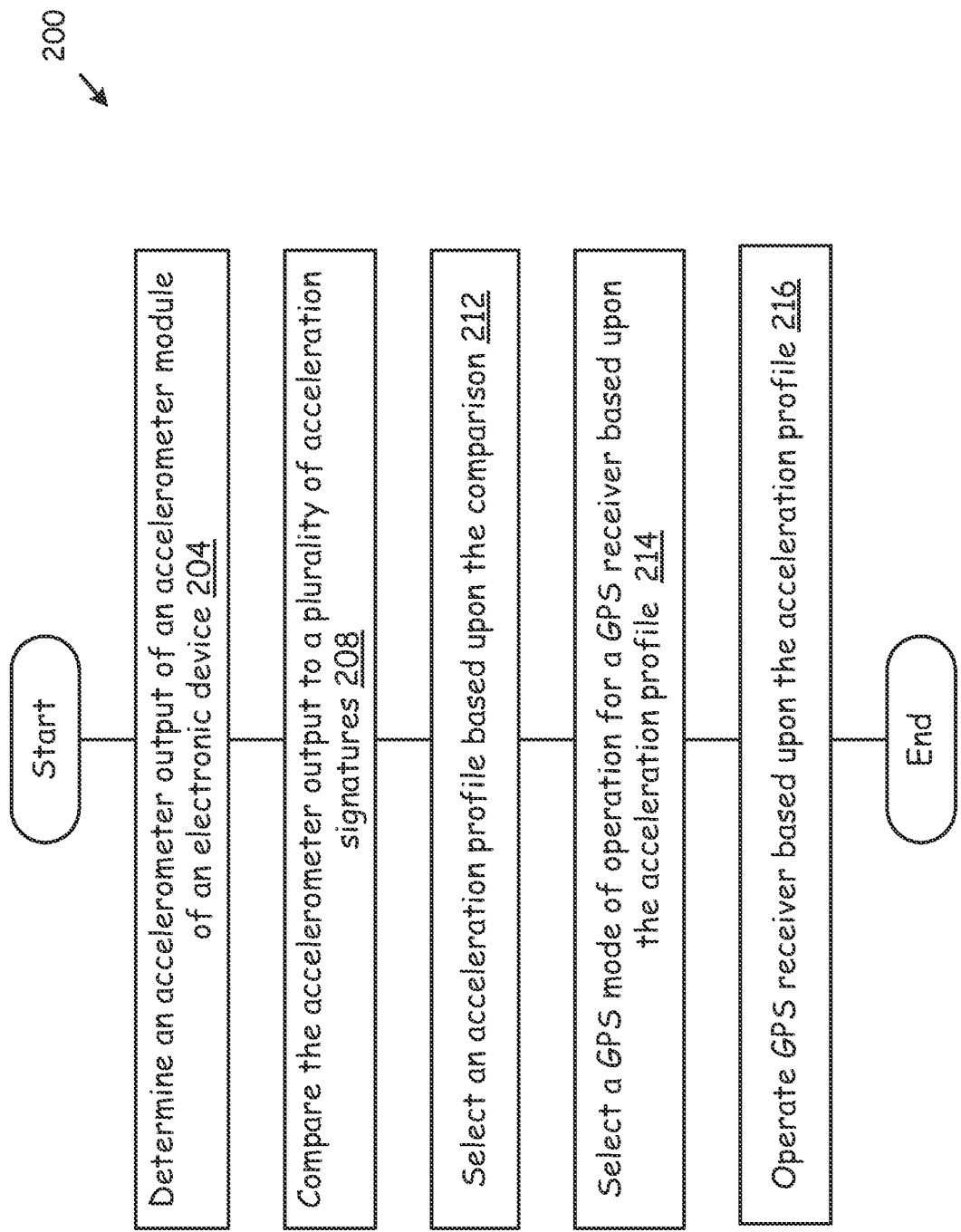
FIG. 2 is a flowchart illustrating operations of an electronic device having a GPS receiver and an accelerometer module according to one or more embodiments of the present invention.

FIG. 2 is a flowchart illustrating operations of an electronic device having a GPS receiver and an accelerometer module according to one or more embodiments of the present invention. In FIG. 2, operations 200 begin when an accelerometer output of an accelerometer module of an electronic device is determined, step 204. The accelerometer output is compared to a plurality of acceleration signatures, step 208. The acceleration signatures are discussed herein in greater detail in FIG. 5.

An acceleration profile is selected based upon the comparison of step 208, step 212. A GPS mode of operation for a GPS receiver is selected based upon the acceleration profile, step 214. The GPS receiver is operated based upon the acceleration profile, step 216.

Figure 3:
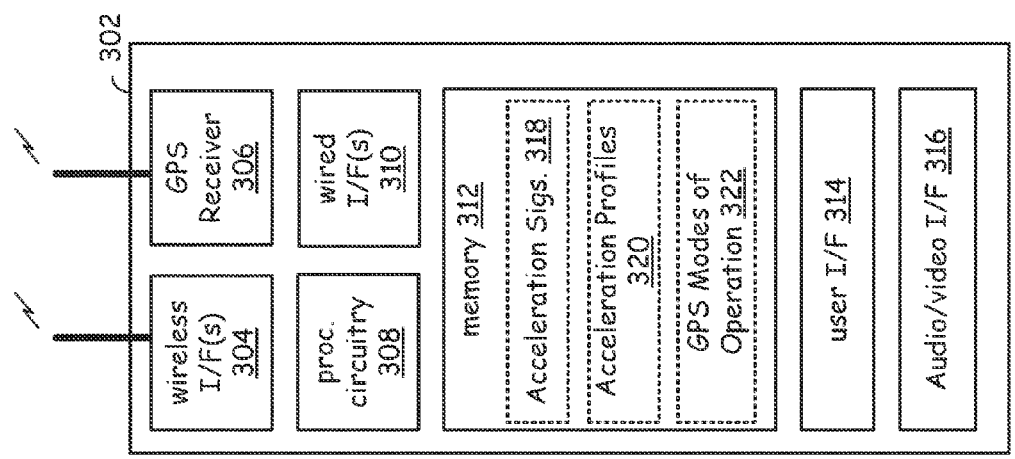
FIG. 3 is a block diagram of an electronic device constructed according to one or more embodiments of the present invention.

FIG. 3 is a block diagram illustrating an electronic device constructed according to one or more embodiments of the present invention. The electronic device 302 of FIG. 3 may include one or more wireless interfaces 304, a Global Positioning System (GPS) receiver 306, processing circuitry 308, may include one or more wired interfaces 310, and memory 312. The electronic device 302 typically would also include a user interface 314 and an audio/video interface 316. The memory 312 stores data and software instructions corresponding to acceleration signatures 318, acceleration profiles 320, and GPS modes of operation 322. The wireless interfaces 304 support wireless communications between the electronic device 302 and at least one other device. This wireless interface 304 may be consistent with a Bluetooth interface, cellular communications, Wireless Local Area Network (WLAN) communications, Wireless Personal Area Network (WPAN) communications, Satellite communication system communications, Wireless Wide Area Network (WWAN) communications, millimeter wave communications, and near field communications.

The processing circuitry 308 may include one or more of a system processor, a digital signal processor, a processing module, dedicated hardware, application specific integrated circuit, or other circuitry that is capable of executing software instructions and for processing data. The processing circuitry 308 is coupled to the communications interface and to an accelerometer module (not shown). The processing circuitry 308 is operable to compare the accelerometer output to a plurality of acceleration signatures 318. Based upon the comparison, an acceleration profile is selected from acceleration profiles 320. The processing circuitry 308 selects a GPS mode of operation 322 for the GPS receiver based upon the acceleration profile.

The memory 312 may be RAM, ROM, FLASH RAM, FLASH ROM, an optical memory, magnetic memory, or other types of memory that is capable of storing data and/or instructions in allowing processing circuitry to access same. The wired interfaces 310 may include a USB interface, a fire wire interface, a serial interface, a parallel interface, an optical interface, or another type of interface supported by a media that is copper, metal, or optical.

The user interface 314 may include keypad, video display, cursor control, touch pad, or other type of interface that allows a user to interface with the electronic device 302. The audio/video interface 316 may couple the electronic device 302 to one or more video monitors to provide display for the GPS operations supported by the electronic device 302.

Figure 4:
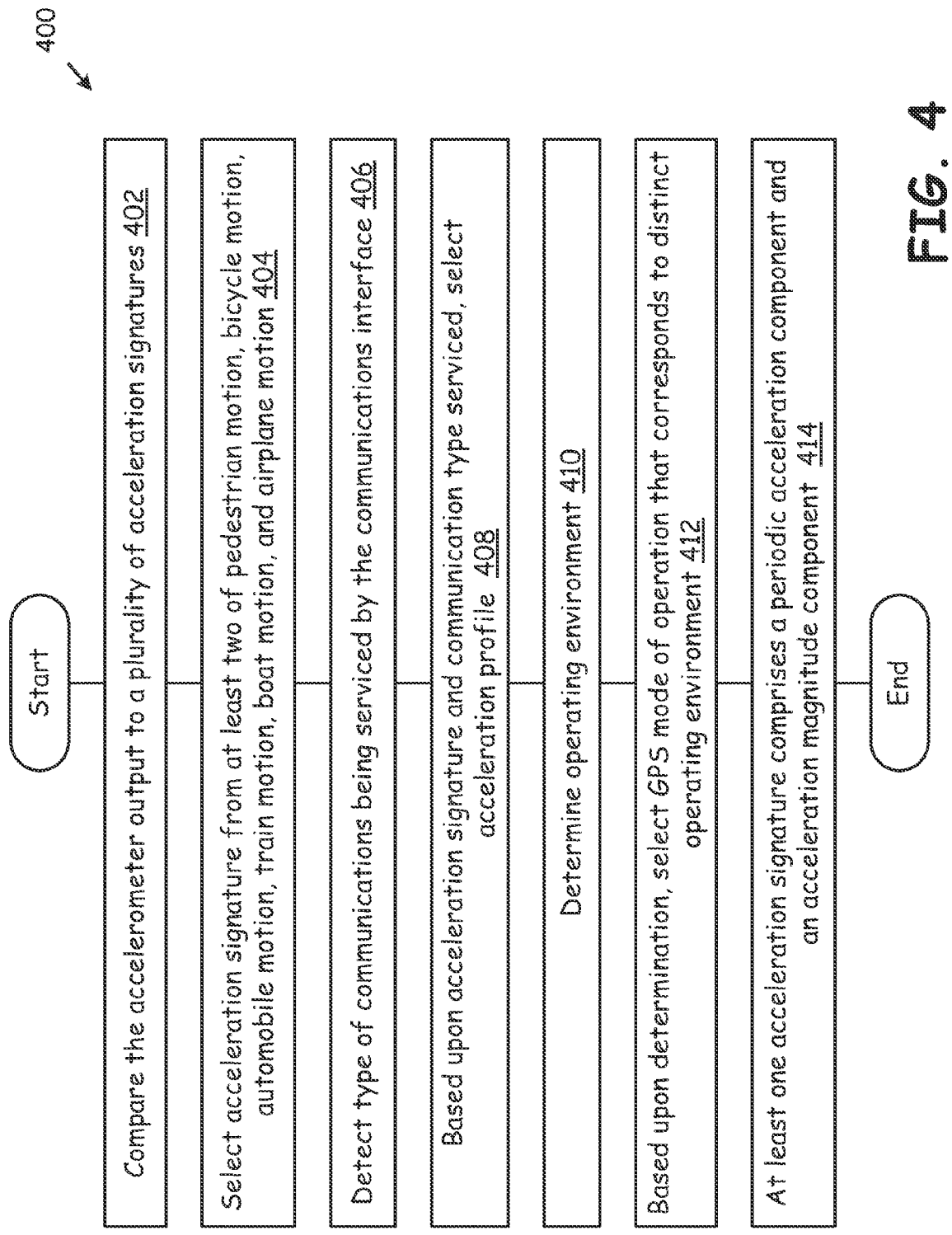
FIG. 4 is a flowchart illustrating operations of the step of comparing accelerometer output to acceleration signatures of an electronic device constructed according to one or more embodiments of the present invention.

FIG. 4 is a flowchart illustrating operations of the step of comparing accelerometer output to acceleration signatures of an electronic device constructed according to one or more embodiments of the present invention. In FIG. 4, operations 400 begin when the accelerometer output is compared to a plurality of acceleration signatures, step 402. An acceleration signature is selected from at least two of pedestrian motion, bicycle motion, motorcycle motion, automobile motion, train motion, boat motion, and airplane motion, step 404. It is understood that other types of motion and various versions of the transportation modes (e.g., fishing boat, sailboat, cruise ship, etc.) may also be considered in the present invention.

The type of communications being serviced is detected by the communications interface, step 406. Based upon acceleration signature and communication type serviced, an acceleration profile is selected, step 408. An operating environment is determined, step 410. Based upon the determination, a GPS mode of operation is selected that corresponds to a distinct operating environment, step 412. At least one acceleration signature comprises a periodic acceleration component and an acceleration magnitude component, step 414.

The acceleration signature table may include acceleration profiles that have certain acceleration frequency that corresponds to differing users, e.g., pedestrian, automobile, boat, airplane, train, etc. For example, airplanes typically have a range of expected oscillation frequencies as do boats, pedestrians, and automobiles. Based upon measured acceleration frequency and comparison to the signatures, a positive correlation may be determined.

Further, the table 500 may include additional signature characteristics as well. For example, the table may include audio information that is compared to data captured by a microphone of the electronic device. Airplanes, boats, cars, and pedestrians, for example may be exposed to unique surrounding noise, which may be used to identify the particular use case of the electronic device. Further, the table 500 may include location information that is employed to identify the use case, e.g., over water is an airplane or boat, at altitude is an airplane, etc.

The table 500 may also store accelerometer spectral characterizations for the differing use cases, which are employed to select the GPS operating mode. These spectral characterizations may be pre-filtering or post filtering; such filtering employed to improve the use case selection process.

Figure 5:
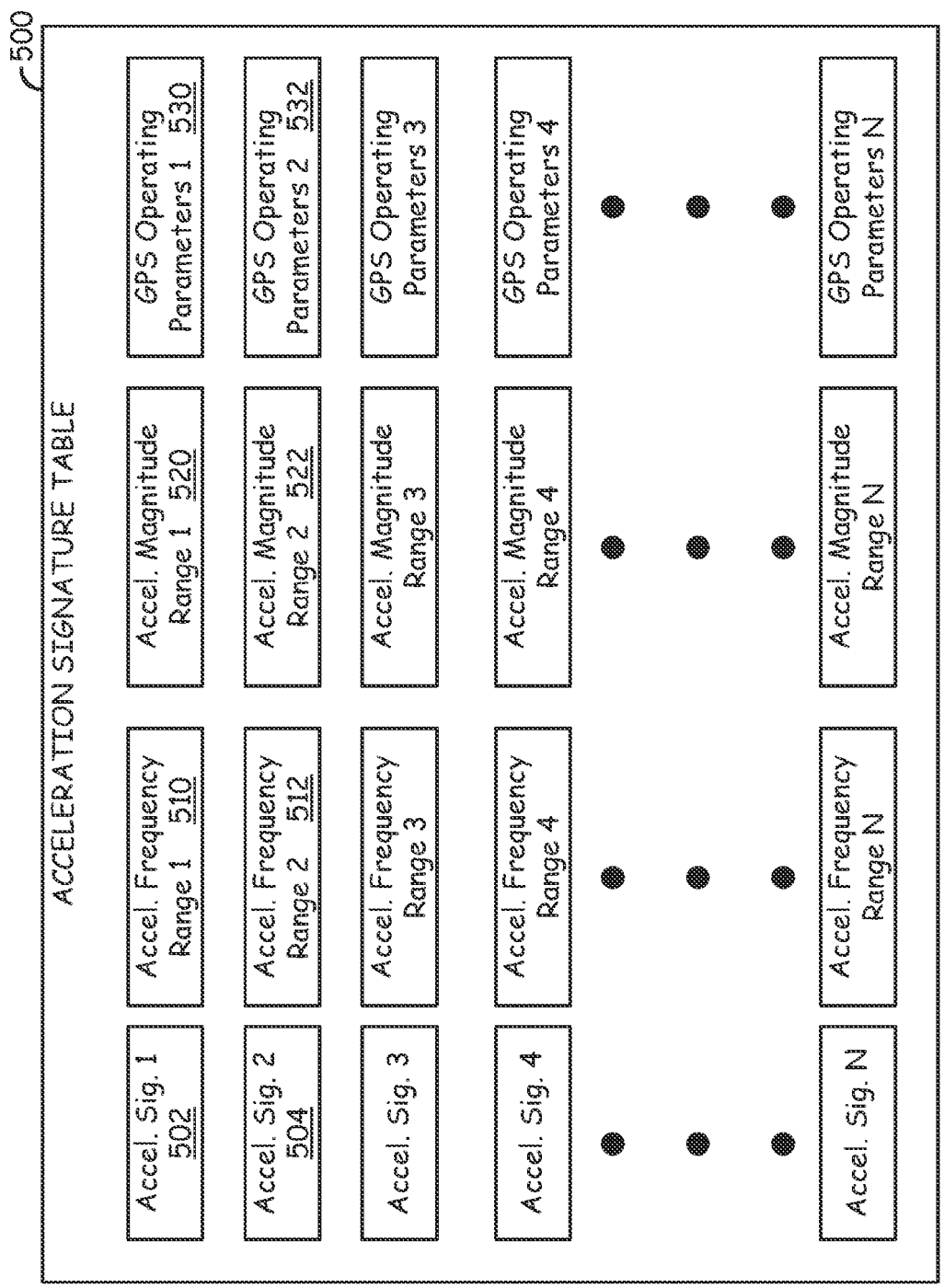
FIG. 5 is a table diagram illustrating different accelerometer signatures of an electronic device constructed according to one or more embodiments of the present invention.

FIG. 5 is a table diagram illustrating different accelerometer signatures of an electronic device constructed according to one or more embodiments of the present invention. The acceleration signature table 500 of FIG. 5 shows Acceleration Signature 1 502 that corresponds to Acceleration Frequency Range 1 510, Acceleration Magnitude Range 1 520, and GPS Operating Parameters 1 530.

In FIG. 5, the Acceleration Signatures in column 1 are mode of transportation identifiers. For example, Acceleration Signature 1 502 can represent an acceleration signature of an automobile, and Acceleration Signature 2 504 can represent an acceleration signature of a pedestrian. Acceleration Frequency Ranges of FIG. 5 are the frequencies of acceleration and deceleration of the electronic device of the present invention. For example, in FIG. 5, Acceleration Frequency Range 1 510 of an automobile would be a slower or lower frequency of acceleration and deceleration or braking than that Acceleration Frequency Range 2 512 of a pedestrian. A pedestrian has acceleration jolts that occur at each step.

Acceleration Magnitude Ranges in FIG. 5 relate to vibration or lack of vibration of the various modes of transportation. For example, Acceleration Magnitude Range 1 520 of an automobile having an engine vibration, vibration from tires rumbling along a roadway, and the like would be higher than Acceleration Magnitude Range 2 522 of a pedestrian that has no engine or other such vibration.

In one embodiment of the present invention, the processing circuitry is operable to compare accelerometer output to a plurality of acceleration signatures from the Acceleration Signature Table of FIG. 5. The acceleration signatures are made up of Acceleration Frequency Ranges and Acceleration Magnitude Ranges. Based upon this comparison, an acceleration profile is selected and a GPS mode of operation or GPS Operating Parameters is selected for the GPS receiver based upon the acceleration profile. For example, in FIG. 5, the GPS Operating Parameters 1 530 would be selected instead of the GPS Operating Parameters 2 532 if the Acceleration Frequency Range and Acceleration Magnitude Range were more consistent with automobile ranges based upon a comparison of the accelerometer output (i.e., Acceleration Frequency Range and Acceleration Magnitude Range) to other Acceleration Frequency Ranges and Acceleration Magnitude Ranges on the Acceleration Signature Table 500.

The acceleration signature table may include acceleration profiles that have certain acceleration frequency that corresponds to differing users, e.g., pedestrian, automobile, boat, airplane, train, etc. For example, airplanes typically have a range of expected oscillation frequencies as do boats, pedestrians, and automobiles. Based upon measured acceleration frequency and comparison to the signatures, a positive correlation may be determined.

Further, the table 500 may include additional signature characteristics as well. For example, the table may include audio information that is compared to data captured by a microphone of the electronic device. Airplanes, boats, cars, and pedestrians, for example may be exposed to unique surrounding noise, which may be used to identify the particular use case of the electronic device. Further, the table 500 may include location information that is employed to identify the use case, e.g., over water is an airplane or boat, at altitude is an airplane, etc.

The table 500 may also store accelerometer spectral characterizations for the differing use cases, which are employed to select the GPS operating mode. These spectral characterizations may be pre-filtering or post filtering; such filtering employed to improve the use case selection process.

The teachings of FIG. 5 are an example of an algorithm to select an acceleration profile. Classification algorithms that are well known in signal processing applications may be applied to the operations of FIG. 5, such as those based on Fourier analysis of the acceleration patterns, without departing from the teachings of the present invention.

FIG. 6 illustrates more detailed operations of an electronic device having a GPS receiver and an accelerometer module according to one or more embodiments of the present invention. In FIG. 6, operations 600 begin when acceleration is measured, step 602 by an electronic device of the present invention shown in FIG. 3 having a communications interface that is operable to support communications between the electronic device and at least one other device. The communications interface supports at least one of cellular communications, Wireless Local Area Network (WLAN) communications, Wireless Personal Area Network (WPAN) communications, Satellite communication system communications, Wireless Wide Area Network (WWAN) communications, millimeter wave communications, and near field communications. The electronic device comprises a Global Positioning System (GPS) receiver, and an accelerometer module that is operable to produce accelerometer output. Processing circuitry is coupled to the communications interface and to the accelerometer module. The processing circuitry is further operable to select the GPS mode of operation based upon GPS location data. In one embodiment, the processing circuitry is further operable to select a differing acceleration profile based upon additional accelerometer output.

In FIG. 6, the acceleration is compared to a first acceleration signature, step 604, via the processing circuitry. Acceleration signatures may correspond to pedestrian motion, bicycle motion, motorcycle motion, automobile motion, train motion, boat motion, or airplane motion. In one embodiment, at least one acceleration signature comprises a periodic acceleration component and an acceleration magnitude component. According to one embodiment of the present invention, the accelerometer output may comprise data in two dimensions, and at least one acceleration signature comprises two dimensional components. According to another embodiment of the present invention, the accelerometer output comprises data in three dimensions, and at least one acceleration signature comprises three dimensional components.

A determination is made regarding whether the acceleration signature comparison is more favorable than a current match, step 606. In one embodiment, the acceleration profile may be further selected based upon one or more types of communications being serviced by the communications interface. If No, the process repeats to steps 604 and 606, where acceleration is compared to a next acceleration signature, step 604, and the determination is made regarding whether the comparison is more favorable than the current match, step 606. If Yes, the more favorable comparison or match is selected as the most favorable match, step 608.

A determination is made regarding whether the comparisons are completed, step 610. If No, the process repeats to steps 604 and 606 where acceleration is compared to a next acceleration signature, step 604, and the determination is made regarding whether the comparison is more favorable than the current match, step 606, and so forth. If Yes, a Global Positioning System (GPS) mode of operation is enacted, step 612. The GPS mode of operation may be selected for the GPS receiver based upon the acceleration profile. A selected GPS mode of operation selected may correspond to a distinct operating environment. The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An integrated circuit comprising:
   a Global Positioning System (GPS) receiver interface configured to interface with a GPS receiver;
   an accelerometer interface configured to receive accelerometer data including acceleration frequency and acceleration magnitude; and
   processing circuitry communicatively coupled to the GPS receiver interface and to the accelerometer interface and configured to:
   receive the accelerometer data via the accelerometer interface;
   compare the acceleration frequency and the acceleration magnitude to respective acceleration frequency ranges and acceleration magnitude ranges of a plurality of acceleration signatures, a first of the plurality of acceleration signatures having two-dimensional acceleration components and a second of the plurality of acceleration signatures having three-dimensional acceleration components;

based upon the comparison, select an acceleration profile;
select a GPS mode of operation based upon the acceleration profile; and
direct the GPS receiver to operate according to the selected GPS mode of operation via the GPS receiver interface.

2. The integrated circuit of claim 1,
further comprising a communications interface that is configured to support communications between the integrated circuit and at least one other device; and
wherein the processing circuitry is further configured to select the acceleration profile based upon one or more types of communications that are currently serviceable by the communications interface.

3. The integrated circuit of claim 2, wherein the one or more types of communications that are currently serviceable by the communications interface include one or more of cellular communications, Wireless Local Area Network (WLAN) communications, Wireless Personal Area Network (WPAN) communications, or Satellite communication system communications.

4. The integrated circuit of claim 1 wherein the plurality of acceleration signatures correspond to at least two of:
pedestrian motion;
bicycle motion;
motorcycle motion;
automobile motion;
train motion;
boat motion; or
airplane motion.

5. The integrated circuit of claim 1, wherein a selected GPS mode of operation corresponds to a distinct operating environment.

6. The integrated circuit of claim 1, wherein the processing circuitry is further configured to select the GPS mode of operation based upon a time of day and/or a day of week.

7. The integrated circuit of claim 1, wherein the processing circuitry is further configured to select the GPS mode of operation based upon GPS location data received via the GPS receiver interface.

8. The integrated circuit of claim 1, wherein the GPS receiver interface and the accelerometer interface comprise a single interface.

9. The integrated circuit of claim 1, wherein at least one acceleration signature comprises an acceleration frequency component and an acceleration magnitude component.

10. A method for operating an integrated circuit comprising:
receiving accelerometer data including acceleration frequency and acceleration magnitude via an accelerometer interface;
comparing the acceleration frequency and the acceleration magnitude to respective acceleration frequency ranges and acceleration magnitude ranges of a plurality of acceleration signatures, a first of the plurality of acceleration signatures having two-dimensional acceleration components and a second of the plurality of acceleration signatures having three-dimensional acceleration components;
based upon the comparison, selecting an acceleration profile;
selecting a Global Positioning System (GPS) mode of operation based upon the acceleration profile; and
directing a GPS receiver to operate according to the selected GPS mode of operation via a GPS receiver interface.

11. The method of claim 10, further comprising:
communicating with at least one other device via a communications interface; and
selecting the acceleration profile further based upon one or more types of communications that are currently serviceable by the communications interface.

12. The method of claim 11, wherein the one or more types of communications that are currently serviceable by the communications interface include one or more of cellular communications, Wireless Local Area Network (WLAN) communications, Wireless Personal Area Network (WPAN) communications, or Satellite communication system communications.

13. The method of claim 10, wherein the plurality of acceleration signatures correspond to at least two of:
pedestrian motion;
bicycle motion;
motorcycle motion;
automobile motion;
train motion;
boat motion; or
airplane motion.

14. The method of claim 10, wherein a selected GPS mode of operation corresponds to a distinct operating environment.

15. The method of claim 10, further comprising selecting the GPS mode of operation further based upon a time of day and/or a day of week.

16. The method of claim 10, further comprising selecting the GPS mode of operation based upon GPS location data received via the GPS receiver interface.

17. The method of claim 10, wherein at least one acceleration signature comprises an acceleration frequency component and an acceleration magnitude component.

18. An integrated circuit comprising:
a Global Positioning System (GPS) receiver interface configured to interface with a GPS receiver;
an accelerometer configured to produce accelerometer data including acceleration frequency and acceleration magnitude; and
processing circuitry communicatively coupled to the GPS receiver interface and to the accelerometer and configured to:
receive the accelerometer data;
compare the acceleration frequency and the acceleration magnitude to respective acceleration frequency ranges and acceleration magnitude ranges of a plurality of acceleration signatures, a first of the plurality of acceleration signatures having two-dimensional acceleration components and a second of the plurality of acceleration signatures having three-dimensional acceleration components;
based upon the comparison, select an acceleration profile;
select a GPS mode of operation based upon the acceleration profile; and
direct the GPS receiver to operate according to the selected GPS mode of operation via the GPS receiver interface.

19. The integrated circuit of claim 18,
further comprising a communications interface that is configured to support communications between the integrated circuit and at least one other device; and
wherein the processing circuitry is further configured to select the acceleration profile based upon one or more types of communications that are currently serviceable by the communications interface.

20. The integrated circuit of claim 18, wherein the processing circuitry is further configured to select the GPS mode of operation based upon a time of day and/or a day of week or GPS location data received via the GPS receiver interface.

* * * * *